MACHINE TOOL

Filed May 16, 1968

INVENTORS
ROBERT L. PRICE
ROBERT S. HAHN
BY [signature]
ATTORNEY 3,554,062

MACHINE TOOL

Robert L. Price, Paxton, and Robert S. Hahn, Northboro, Mass., assignors to The Heald Machine Company, Worcester, Mass., a corporation of Delaware

Filed May 16, 1968, Ser. No. 729,666
Int. Cl. B23b *29/034*
U.S. Cl. 77—58 6 Claims

ABSTRACT OF THE DISCLOSURE

This invention relates to a machine tool and, more particularly, to a spindle construction that permits very accurate radial adjustment of a tool mounted thereon by means of a transverse slot in the spindle which is opened to selected angles by the introduction of pressure fluid.

BACKGROUND OF THE INVENTION

In the operation of machine tools, such as a boring machine, there are occasions when it is desirable to move the cutting element radially very accurately. For instance, in boring it is important that it be possible to draw the tool inwardly before the spindle is drawn out of the bore; this is done to avoid a drag-line. The inward retraction is relatively easy to accomplish, but returning the tool accurately to its original position (for duplication of the bore diameter) is not an easy matter. Attempts in the past to bring about radial adjustment of this kind have resulted in very complicated and expensive constructions. These and other difficulties experienced with the prior art devices have been obviated in a novel manner by the present invention.

It is, therefore, an outstanding object of the invention to provide a machine tool having a means for adjusting the position of a rotating tool very accurately without stopping the rotation.

Another object of this invention is the provision of a machine tool capable of size adjustment by simple and inexpensive means.

A further object of the present invention is the provision of a machine tool having fluid-pressure operated tool adjustment.

It is another object of the instant invention to provide a machine tool having a means of adjusting the position of the cutting element to accuracies in the order of millionths of an inch.

A still further object of the invention is the provision of a machine tool capable of cutting element retraction and return with very high repeatability.

With these and other objects in view, as will be apparent to those skilled in the art, the invention resides in the combination of parts set forth in the specification and covered by the claims appended hereto.

SUMMARY OF THE INVENTION

In general, the invention has to do with a machine tool having a spindle, having a head with bearings in which the spindle is rotatably mounted, the spindle having a tool mounted at one end for rotation therewith, the spindle having a slot extending transversely thereof intermediate of its ends, and having means for introducing pressure fluid into the slot for producing an angular displacement of the centerlines of the portions of the spindle on either side of the slot.

More specificaly, the surface of the spindle in the vicinity of the slot is cylindrical and a sealing element is provided in the form of a ring closely surrounding the spindle and having longitudinally spaced elastomer O-rings residing on opposite sides of the slot. The sealing element, therefore, surrounds the solt and prevents the escape of pressure fluid therefrom.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
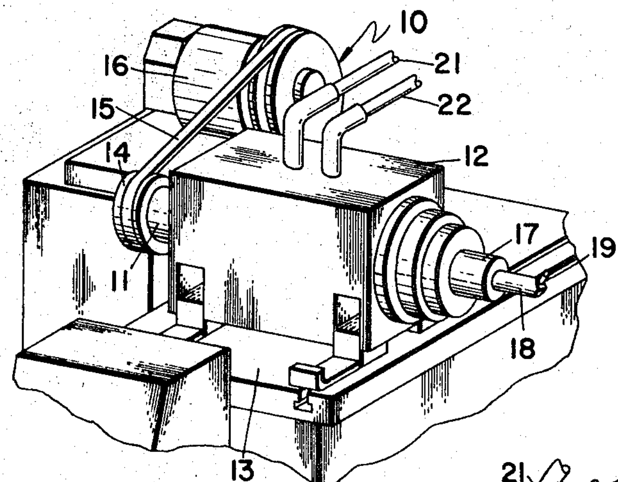
FIG. 1 is a perspective view of a machine tool embodying the principles of the present invention.

Referring first to FIG. 1, which best shows the general features of the invention, the machine tool, indicated generally by the reference numeral 10, is shown as having a spindle 11. The spindle is rotatably mounted in a head 12 carried on a base 13. One end of the spindle extends from the head and carries a pulley 14 which is driven through a belt 15 by a motor 16. The other end of the spindle carries a tool 17 consisting in the preferred embodiment of a boring bar 18 having at its outer end a cutting element 19. A pressure fluid conduit 21 and an air conduit 22 enter the upper central part of the head 12.

Figure 2:
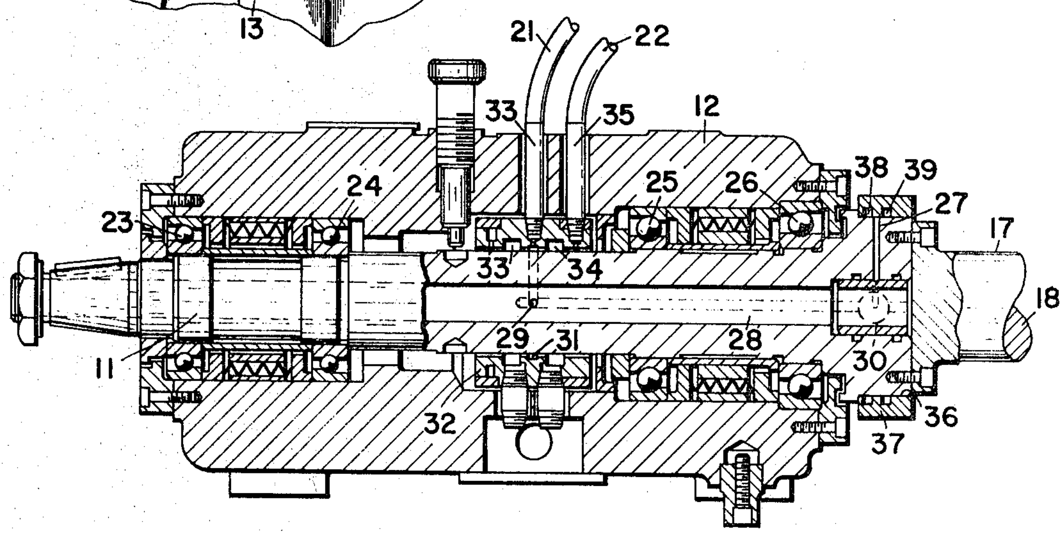
FIG. 2 is a vertical sectional view of the machine tool taken on the line II—II of FIG. 3.
Figure 3:
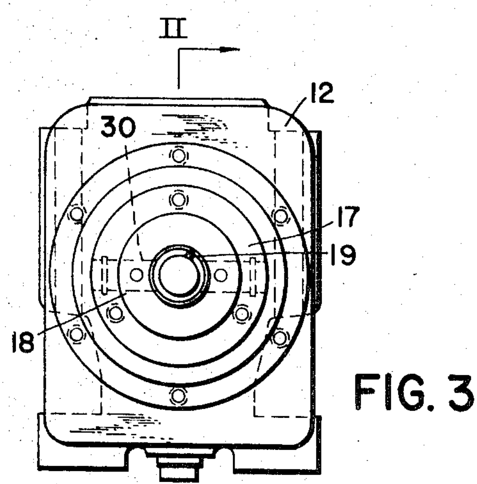
FIG. 3 is a front elevational view of the invention.

In FIG. 2 it can be seen that the head 12 is provided at one end with a set of ball bearings 23 and 24 and at the other end with another set of ball bearings 25 and 26. Near the end of the spindle it is provided with a transverse slot 27 which extends inwardly to the center of the spindle where it is hydraulically connected to a passage 28. The inner portion of the slot merges into a transverse bore 30. This passage extends coaxially of the spindle to a position about midway between the two sets of ball bearings. A radial passage 29 extends from the passage 28 to a groove 31 formed on a commutation ring 32 mounted in the head. A fluid pressure inlet port 33 extends from the groove through the ring and head for connection to the conduit 21. Grooves 33 and 34 extend around the ring on either side of the groove 31 and are connected to drain. The conduit 22 is connected to an air entrance port 35 which extends through the head and ring to various passages in the well-known manner to pressurize the head to prevent the entrance of air-carried foreign matter.

The end of the spindle having the slot 27 lies outside of the head 12 and is provided with a cylindrical surface 36 around which extends a sealing element consisting of a ring 37 whose inner bore is provided with O-rings 38 and 39 located on either side of the slot.

The operation of the apparaaus will now be readily understood in view of the above description. The introduction of pressure fluid takes place through the conduit 21 to the slot 27. The fluid operates on the sides of the slot to produce an angular displacement of the ports of the spindle on opposite sides of the slot. Since the spindle is firmly held in the bearings 23, 24, 25, and 26, this displacement or bending of the spindle causes the outer end to move and to carry the tool 17 with it. As a matter of fact, the amount of movement of the boring bar 18 and the cutting element 19 is proportional to the amount of fluid pressure. It is possible, for instance, to perform the boring operation with a fixed, accurate fluid pressure in the slot (using a pressure regulating valve and an on-off, solenoid-operated valve) and, then, by removing the fluid pressure to retract the cutting element as the bar is removed from the bore. This assures that no drag-line is formed on the finished bored surface. Later, the same fluid pressure can be introduced into the slot to return the cutting element to the original position for the next boring operation. Because of the small change in slot angularity produced by a given change in fluid pressure, the position duplication from workpiece to workpiece can be excellent.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising (a) a spindle, (b) a head having bearings in which the spindle is rotatably mounted, the spindle having a tool mounted at one end for rotation therewith, the spindle having a slot extending transversely thereof intermediate of its ends, (c) means for introducing pressure fluid into the slot for producing an angular displacement of the centerlines of the portions of the spindle on either side of the slot, and (d) a sealing element mounted on the spindle to surround the slot and prevent escape of pressure fluid therefrom.

2. A machine tool as recited in claim 1, wherein the head includes two sets of ball bearings spaced longitudinally of the spindle and wherein the slot is located on a portion of the spindle not lying between the bearings.

3. A machine tool as recited in claim 1, wherein the tool includes an elongated bar having a cutting element mounted at one end and fastened to the spindle at the other end.

4. A machine tool as recited in claim 3, wherein the spindle and bar are both cylindrical and are fastened to one another in coaxial relationship.

5. A machine tool as recited in claim 1, wherein the surface of the spindle in the vicinity of the slot is cylindrical and wherein the sealing element is a ring closely surrounding the spindle and having longitudinally spaced elastomer O-rings residing on opposite sides of the slot.

6. A machine tool as recited in claim 1, wherein the slot extends inwardly to the center of the spindle where it intersects a longitudinally-extending passage and wherein the pressure fluid is introduced to the said passage at a portion thereof substantially separated from the slot.

References Cited

UNITED STATES PATENTS 2,553,699 5/1951 Brodin ---------------- 51—166
2,916,951 12/1959 Carlson et al. ---------- 77—58
3,007,353 11/1961 Garnett ---------------- 77—3
3,007,356 11/1961 Jones ---------------- 77—58

GERALD A. DOST, Primary Examiner

U.S. Cl. X.R.

77—1